United States Patent
Bolton et al.

(10) Patent No.: US 7,441,058 B1
(45) Date of Patent: Oct. 21, 2008

(54) METHOD AND SYSTEM FOR CONTROLLING AN ACCESSORY HAVING A TUNER

(75) Inventors: Lawrence G. Bolton, Fremont, CA (US); Gregory T. Lydon, Santa Cruz, CA (US); Terry Tikalsky, Sunnyvale, CA (US); Donald J. Novotney, San Jose, CA (US); John B. Filson, San Jose, CA (US); David Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 228 days.

(21) Appl. No.: 11/519,386

(22) Filed: Sep. 11, 2006

(51) Int. Cl.
  *G06F 13/42* (2006.01)
(52) U.S. Cl. .................... 710/105; 710/300; 710/62; 710/64
(58) Field of Classification Search ......... 710/300–306, 710/104–106, 8–12, 36–38, 62–64, 72
  See application file for complete search history.

(56) References Cited

U.S. PATENT DOCUMENTS

| | | | |
|---|---|---|---|
| 4,673,861 A | 6/1987 | Dubovsky et al. | |
| 6,012,105 A | 1/2000 | Rubbmark et al. | |
| 6,591,085 B1 | 7/2003 | Grady | |
| 6,674,995 B1 | 1/2004 | Meyers et al. | |
| 6,725,061 B1 | 4/2004 | Hutchison, IV et al. | |
| 6,754,468 B1 | 6/2004 | Sieben et al. | |
| 6,776,660 B1 | 8/2004 | Kubota et al. | |
| 7,062,261 B2 * | 6/2006 | Goldstein et al. | 455/419 |
| 7,187,947 B1 * | 3/2007 | White et al. | 455/556.1 |
| 2002/0010759 A1 | 1/2002 | Hitson et al. | |
| 2002/0065074 A1 | 5/2002 | Cohn et al. | |
| 2002/0151327 A1 | 10/2002 | Levitt | |
| 2002/0156546 A1 | 10/2002 | Ramaswamy | |
| 2003/0059022 A1 | 3/2003 | Nebiker et al. | |
| 2003/0073432 A1 | 4/2003 | Meade | |
| 2003/0220988 A1 * | 11/2003 | Hymel | 709/220 |
| 2003/0236075 A1 | 12/2003 | Johnson et al. | |
| 2004/0116005 A1 * | 6/2004 | Choi | 439/894 |

(Continued)

FOREIGN PATENT DOCUMENTS

JP  11-288420  10/1999

OTHER PUBLICATIONS

Altec Lansing, "inMotion Users Guide," Corp. Headquarters, 535 Rte.6 & 209, Milford, PA 18337.

(Continued)

*Primary Examiner*—Raymond N Phan
(74) *Attorney, Agent, or Firm*—Townsend and Townsend and Crew LLP

(57) ABSTRACT

A method, system, and connector interface for controlling an accessory. The method includes obtaining, by a portable media player, tuning information from the accessory; and controlling, by the portable media player, the accessory based on the tuning information. According to the system and method disclosed herein, the portable media player and accessory may utilize a plurality of commands utilized in a variety of environments such as within a connector interface system environment to control access to the portable media player.

64 Claims, 9 Drawing Sheets

U.S. PATENT DOCUMENTS

| | | |
|---|---|---|
| 2004/0162029 A1 | 8/2004 | Grady |
| 2004/0198436 A1 | 10/2004 | Alden |
| 2004/0224638 A1 | 11/2004 | Fadell et al. |
| 2005/0014536 A1 | 1/2005 | Grady |
| 2007/0056013 A1 | 3/2007 | Duncan |
| 2007/0206827 A1 | 9/2007 | Tupman et al. |

OTHER PUBLICATIONS

"ipodDock/iPod Cradle," www.bookendzdocks.com/bookendz/dock_cradle.htm, downloaded Feb. 27, 2003.

"Neuros MP3 Digital Audio Computer," www.neurosaudio.com, downloaded Apr. 9, 2003.

* cited by examiner

| Pin | Signal name | I/O | Function |
|---|---|---|---|
| 1 | ~~FW GND~~ DGND | I | ~~Firewire and charger ground~~ Digital Ground |
| 2 | ~~FW GND~~ DGND | I | ~~Firewire and charger ground~~ Digital Ground |
| 3 | TPA+ | I/O | Firewire signal |
| 4 | USB D+ | I/O | USB signal |
| 5 | TPA- | I/O | Firewire signal |
| 6 | USB D- | I/O | USB signal |
| 7 | TPB+ | I/O | Firewire signal |
| 8 | USB PWR | I | USB power in. NOT for powering; only to detect USB host |
| 9 | TPB- | I/O | Firewire signal |
| 10 | Accessory Identify | I | Pull down in dock to notify iPod of specific device |
| 11 | F/W PWR+ | I | Firewire and charger input power (8V to 30V dc) |
| 12 | F/W PWR+ | I | Firewire and charger input power (8V to 30V dc) |
| 13 | ACCESSORY PWR(3V3) | O | 3.3V output from iPod. Current limited to 100mA. |
| 14 | Reserved | | |
| 15 | ~~USB GND~~ DGND | GND | Digital ground in iPod |
| 16 | DGND | GND | Digital ground in iPod |
| 17 | Reserved | | |
| 18 | Dock Tx | I | Serial protocol (Data to iPod) |
| 19 | Dock Rx | O | Serial protocol (Data from iPod) |
| 20 | Accessory Detect | I/O | |
| 21 | ~~Reserved~~ S Video Y | O | Luminance Component |
| 22 | ~~Reserved~~ S Video C | O | Chrominance Component |
| 23 | ~~Reserved~~ Video Composite | O | Composite Signal |
| 24 | ~~Reserved~~ Remote Sense | I | Detect Remote |
| 25 | LINE-IN L | I | Line level input to the iPod for the left channel |
| 26 | LINE-IN R | I | Line level input to the iPod for the right channel |
| 27 | LINE-OUT L | O | Line level output to the iPod for the left channel |
| 28 | LINE-OUT R | O | Line level output to the iPod for the right channel |
| 29 | Audio Return | GND | Audio return - Singal, never to be grounded inside accessory |
| 30 | DGND | GND | Digital ground iPod |
| 31 | Chassis | | Chassis ground for connector shell |
| 32 | Chassis | | Chassis ground for connector shell |

Fig. 4A

| Pin | Signal name | I/O | Function |
|---|---|---|---|
| 1 | Audio Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Composite Video | O | Video Signal |
| 6 | Accessory 3.3V | O | 3.3V Accessory power 100mA max |
| 7 | Tx | O | Serial protocol (Data from iPod to Device) |
| 8 | Rx | I | Serial protocol (Data to iPod from Device) |
| 9 | D GND | GND | Digital ground for accessory |

Fig. 4B

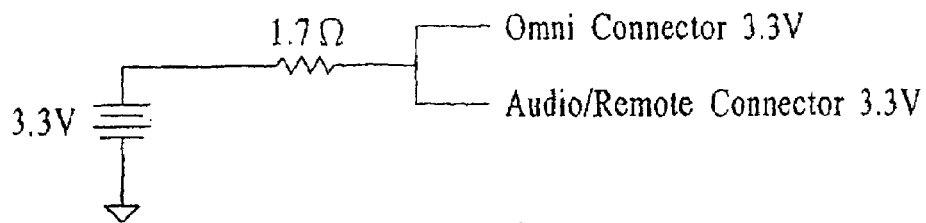

Fig. 5B

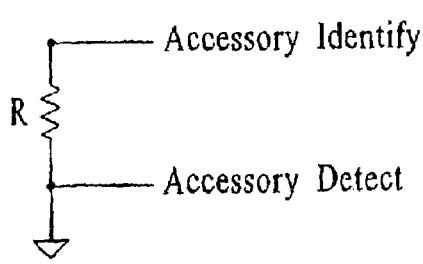

Fig. 5C

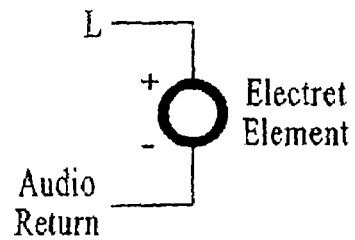

Fig. 5D

METHOD AND SYSTEM FOR CONTROLLING AN ACCESSORY HAVING A TUNER

This application is related to U.S. patent application Ser. No. 11/519,278, entitled "Method and System for Controlling Power Provided to an Accessory", filed on even date herewith, assigned to the assignee of the present application which is incorporated by reference herein.

This application is related to U.S. patent application Ser. No. 11/519,541, "Method and System for Controlling Video Selection and Playback in a Portable Media Player", filed on even date herewith, assigned to the assignee of the present application which is incorporated by reference herein.

FIELD OF THE INVENTION

The present invention relates generally to electrical devices and more particularly to electrical devices such as portable media players that communicate with accessory devices.

BACKGROUND OF THE INVENTION

A portable media player stores media assets, such as audio tracks, video tracks or photos that can be played or displayed on the portable media player. One example of a portable media player is the iPod® portable media player, which is available from Apple Computer, Inc. of Cupertino, Calif. Often, a portable media player acquires its media assets from a host computer that serves to enable a user to manage media assets. As an example, the host computer can execute a media management application to manage media assets. One example of a media management application is iTunes®, version 6.0, produced by Apple Computer, Inc.

A portable media player typically includes one or more connectors or ports that can be used to interface to the portable media player. For example, the connector or port can enable the portable media player to couple to a host computer, be inserted into a docking system, or receive an accessory device. There are today many different types of accessory devices that can interconnect to the portable media player. For example, a remote control can be connected to the connector or port to allow the user to remotely control the portable media player. As another example, an automobile can include a connector and the portable media player can be inserted onto the connector such that an automobile media system can interact with the portable media player, thereby allowing the media content on the portable media player to be played within the automobile. In another example, a digital camera can be connected to the portable media player to download images and the like.

Numerous third-parties have developed accessories for use with portable media players. Some accessories that couple to portable media players include tuners. A tuner is an adjustable device that receives radio frequency broadcast signals (e.g., AM/FM signals) and converts them to sound and/or data. An accessory having a tuner typically couples to the portable media player via a connector or port. An accessory may be used with the portable media player as long as a compatible connector or port is utilized. It is important that the accessory and the portable media player communicate in an efficient and effective manner. The present invention addresses these issues.

SUMMARY OF THE INVENTION

A method, system, and connector interface for controlling an accessory are disclosed. The method includes obtaining, by a portable media player, tuning information from the accessory; and controlling, by the portable media player, the accessory based on the tuning information.

According to the system and method disclosed herein, the portable media player and accessory may utilize a plurality of commands utilized in a variety of environments such as within a connector interface system environment to control access to the portable media player.

BRIEF DESCRIPTION OF THE DRAWINGS

FIG. 4A illustrates the connector pin designations for the docking connector.

FIG. 4B illustrates the connection pin designations for the remote connector.

FIG. 5B illustrates a reference schematic diagram for an accessory power source.

FIG. 5C illustrates a reference schematic diagram for a system for detecting and identifying accessories for the docking connector.

FIG. 5D is a reference schematic of an electret microphone that may be within the remote connector.

DETAILED DESCRIPTION OF THE INVENTION

The present invention relates generally to electrical devices and more particularly to electrical devices such as portable media players that communicate with accessory devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A method and system in accordance with the present invention for controlling an accessory is disclosed. In one embodiment, the method includes obtaining tuning information from the accessory, where the accessory includes a tuner for receiving signals such as radio signals. In one embodiment, the tuning information includes capability information and state information, where the capability information may indicate what capabilities the accessory can perform, what features are present on the accessory, and the state information may indicate band information, frequency information, mode information, received signal strength indication (RSSI) information, etc. The method further includes controlling the accessory based on the tuning information by transmitting tuning information such as control information to the accessory to control the functionality of the accessory. The portable media player and accessory may utilize the plurality of commands utilized in a variety of environments to facilitate controlling access to the portable media player. To describe the features of the present invention in more detail refer now to the following discussion in conjunction with the accompanying figures.

Figure 1:
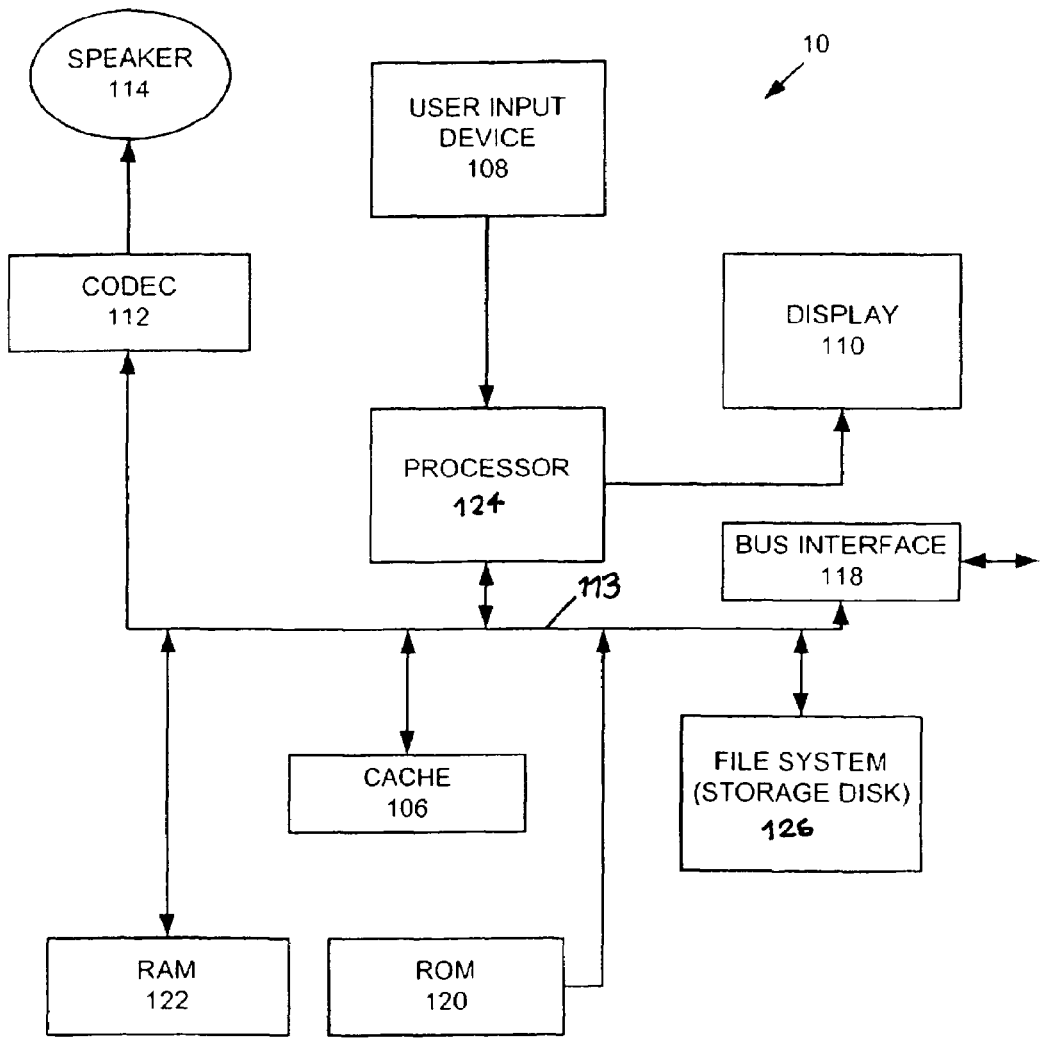
FIG. 1 shows an exemplary portable media player, in accordance with an embodiment of the invention.

FIG. 1 shows a simplified block diagram for an exemplary portable media player 10 in accordance with an embodiment of the invention. The portable media player 10 includes a processor 124 that pertains to a microprocessor or controller for controlling the overall operation of the portable media player 10. The portable media player 10 stores media data pertaining to media assets in a file system 126 and a cache 106. The file system 126 typically provides high capacity storage capability for the portable media player 10. However, to improve access time to the file system 126, the portable media player 10 can also include a cache 106. The cache 106 may be, for example, Random-Access memory (RAM). The relative access time to the cache 106 is substantially shorter than for the file system 126. However, the cache 106 typically does not have the large storage capacity of the file system 126. Further, the file system 126, when active, consumes more power than does the cache 106. The power consumption is particularly important when the portable media player 10 is powered by a battery (not shown). The portable media player 10 also includes additional RAM 122 and a Read-Only Memory (ROM) 120. The ROM 120 can store programs to be executed by the processor 124. The RAM 122 provides volatile data storage, such as for the cache 106.

The portable media player 10 also includes a user input device 108 that allows a user of the portable media player 10 to interact with the portable media player 10. For example, the user input device 108 can take a variety of forms, such as a button, keypad, touch screen, dial, etc. Still further, the portable media player 10 includes a display 110 (screen display) that can be controlled by the processor 124 to display information as well as photos and video tracks to the user. A data bus 113 can facilitate data transfer between at least the file system 126, the cache 106, the processor 124, and other functional blocks. The portable media player 10 also includes a bus interface 116 that couples to a data link 118. The data link 118 allows the portable media player 10 to couple to a host computer that can be a stand alone host computer or part of an interconnected network of computers, such as the Internet or other such distributed systems.

In one embodiment, the portable media player 10 serves to store a plurality of media assets (e.g., songs, videos, photos) in the file system 126. When a user desires to have the portable media player 10 play a particular media item, a list of available media assets is displayed on the display 110. Then, using the user input device 108, a user can select one of the available media assets. The processor 124, upon receiving a selection of a particular media item, such as an audio file, supplies the media data for the particular media item to a coder/decoder (CODEC) 112 via bus 113. The CODEC 112 then produces analog output signals for a speaker 114. The speaker 114 can be a speaker internal to the portable media player 10 or external to the portable media player 10. For example, headphones or earphones that connect to the portable media player 10 would be considered an external speaker. In other applications, media asset files stored on the host computer or in other computers coupled to the host computer by way of the network can be transferred (otherwise referred to as downloaded) to the file system 126 (or the cache 106). These media assets could also be, for example, videos or photos which could be provided to the display 110 via a video processor (not shown) either coupled to or within the processor 124. In this way, the user has available any number and type of media asset files for play by the portable media player 10.

For example, in a particular embodiment, the available media assets are arranged in a hierarchical manner based upon a selected number and type of groupings appropriate to the available media assets. In the case where the portable media player 10 is an MP3 type media player, the available media assets take the form of MP3 files (each of which corresponds to a digitally encoded song or other rendition) stored at least in part in the file system 126. The available media assets (or in this case, songs) can be grouped in any manner deemed appropriate. In one arrangement, the songs can be arranged hierarchically as a list of music genres at a first level, a list of artists associated with each genre at a second level, a list of albums for each artist listed in the second level at a third level, while at a fourth level a list of songs for each album listed in the third level, and so on.

A method and system in accordance with the present invention can be utilized with a portable media player and its associated accessory in a variety of environments. One such environment is within a connector interface system that is described in detail hereinbelow. The connector interface system allows for the portable media player and the accessory to communicate utilizing interface signals over at least one of the pins of the connector interface system.

Connector Interface System Overview

To describe the features of the connector interface system in accordance with the present invention in more detail, refer now to the following description in conjunction with the accompanying drawings.

Docking Connector

Figure 2A:
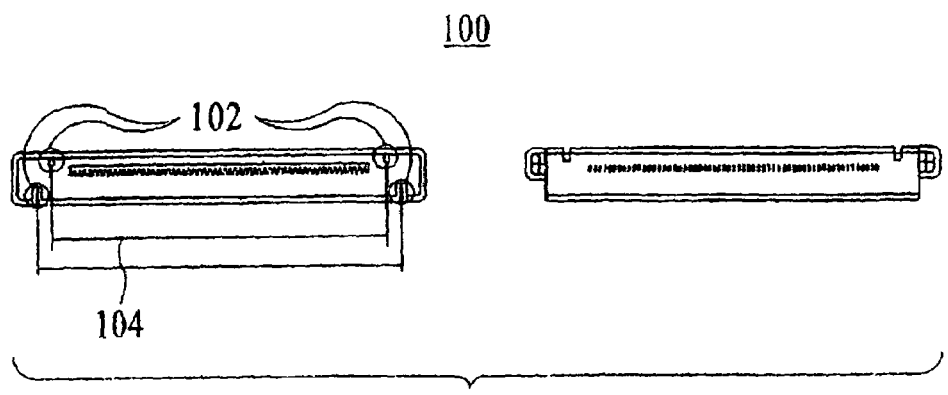
FIGS. 2A and 2B illustrate a docking connector in accordance with the present invention.
Figure 2B:
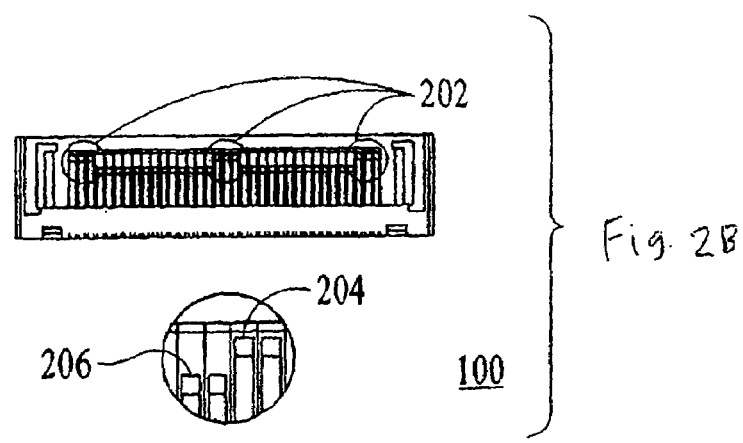

FIGS. 2A and 2B illustrate a docking connector 100 in accordance with the present invention. Referring first to FIG. 2A, the keying features 102 are of a custom length 104. In addition, a specific key arrangement where one set of keys are separated by one length are at the bottom and another set of keys are separated by another length at the top of the connector is used. The use of this key arrangement prevents noncompliant connectors from being plugged in and causing potential damage to the device. The connector for power utilizes a Firewire specification for power. The connector includes a first make/last break contact to implement this scheme. FIG. 2B illustrates the first make/last break contact 202 and also illustrates a ground pin 204 and a power pin 206 related to providing an appropriate first mate/last break contact. In this example, the ground pin 204 is longer than the power pin 206. Therefore, the ground pin 204 would contact its mating pin in the docking accessory before the power pin 206. Therefore the risk of internal electrical damage to the electronics of the device is minimized. Further details of an exemplary embodiment for the docking connector 100 are described in U.S. Pat. No. 6,776,660 entitled CONNECTOR, which issued on Aug. 17, 2004 and is incorporated herein by reference in it entirety.

In addition, a connector interface system in accordance with the present invention uses both USB and Firewire interfaces as part of the same docking connector alignment, thereby making the design more compatible with different types of interfaces, as will be discussed in detail hereinafter. In so doing, more remote accessories can interface with the portable media player.

Remote Connector

Figure 3A:
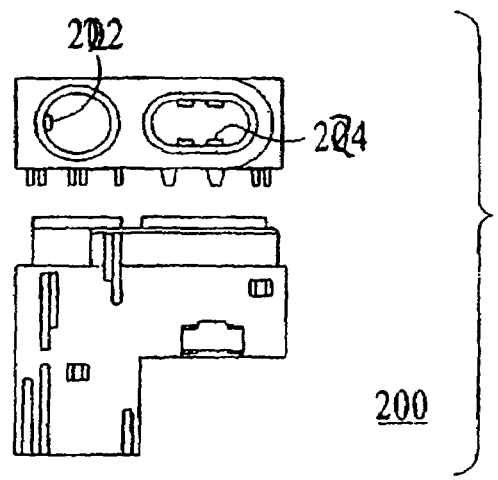
FIG. 3A is a front and top view of a remote connector in accordance with the present invention.
Figure 3B:
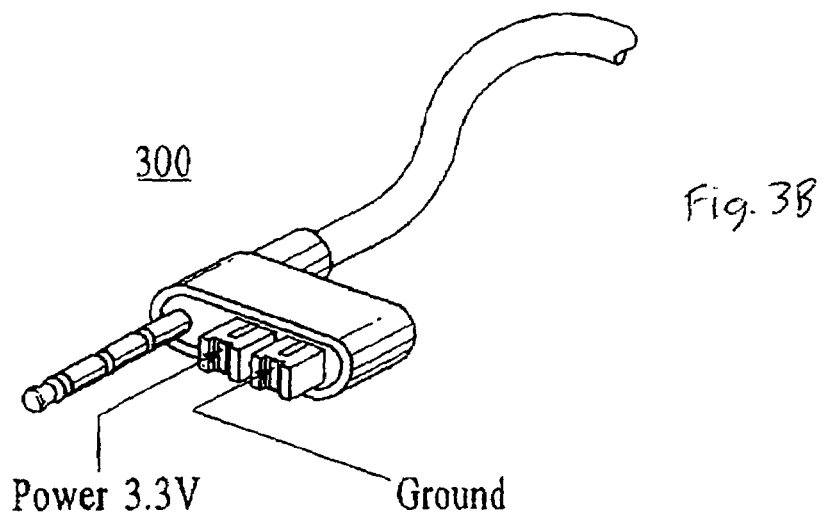
FIG. 3B illustrates a plug to be utilized in the remote connector.
Figure 3C:
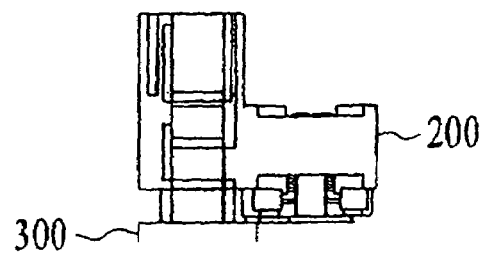
FIG. 3C illustrates the plug inserted into the remote connector.

The connector interface system also includes a remote connector which provides for the ability to output audio, input audio, provides I/O serial protocol, and the ability to input video and output video. FIG. 3A is a front and top view of a remote connector 200 in accordance with the present invention. As is seen, the remote connector 200 includes a top headphone receptacle 222, as well as a second receptacle 224 for remote devices. FIG. 3B illustrates a plug 300 to be utilized in the remote connector. The plug 300 allows these features to be provided via the remote connector. FIG. 3C illustrates the plug 300 inserted into the remote connector 200. Heretofore, all these features have not been implemented in a remote connector. Therefore, a standard headphone cable can be plugged in but also special remote control cables, microphone cables and video cables could be utilized with the remote connector.

To describe the features of the connector interface system in more detail, provided below is a functional description of the docking connector, remote connector and a command set in accordance with the present invention.

Docking and Remote Connector Specifications

For an example of the connector pin designations for both the docking connector and for the remote connector for a portable media player such as an iPod device by Apple Computer, Inc., refer now to FIGS. 4A and 4B. FIG. 4A illustrates the connector pin designations for the docking connector. FIG. 4B illustrates the connection pin designations for the remote connector.

Docking Connector Specifications

FIG. 4A illustrates a typical Firewire connector interface for the docking connector:

Firewire Power:
 a) 8V-30V DC IN
 b) 10 W Max
Firewire Signal:
 a) Designed to IEEE 1394 A Spec (400 Mb/s)

USB Interface

In one embodiment, the portable media player provides two configurations, or modes, of USB device operation: mass storage and portable media player USB Interface (MPUI). The MPUI allows the portable media player to be controlled using an accessory protocol. What is meant by an accessory protocol is the software component of the media player that communicates with accessories over a given transport layer.

Accessory Power

Figure 5A:
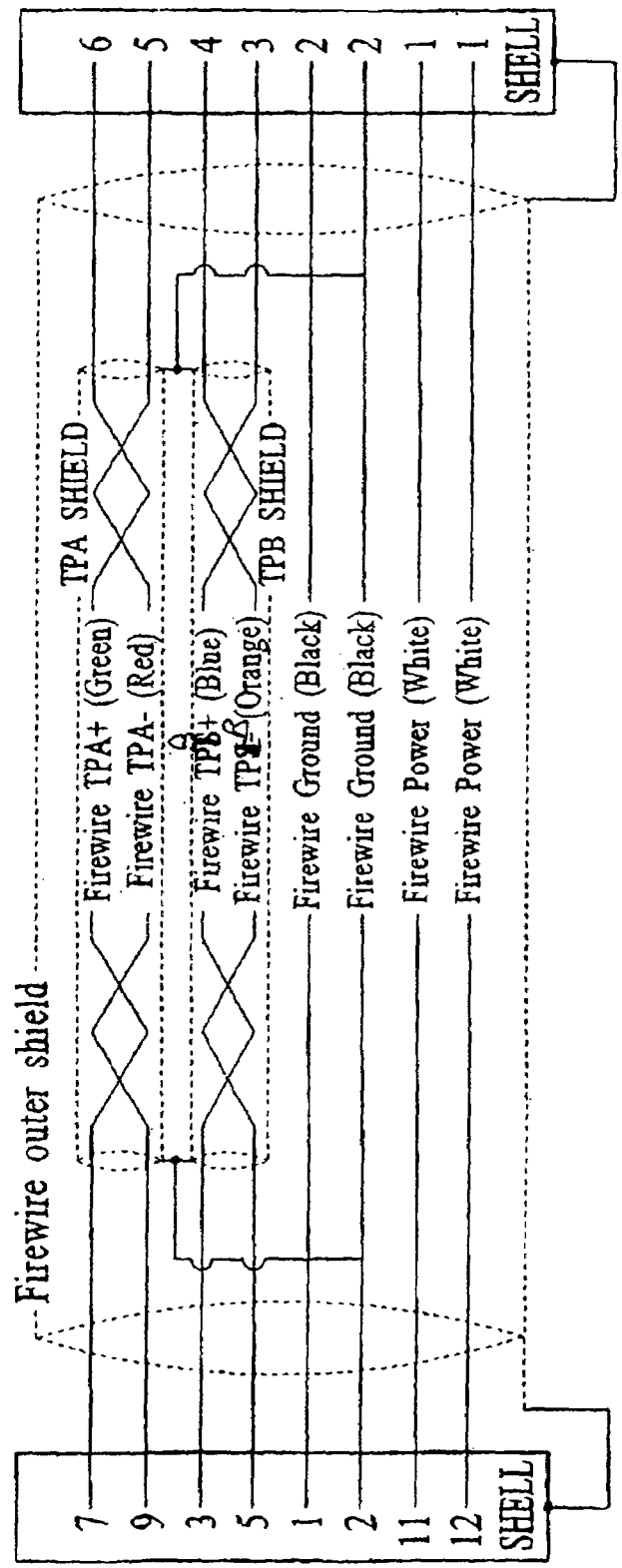
FIG. 5A illustrates a typical FireWire connector interface for the docking connector.

FIG. 5B illustrates the accessory power source. The portable media player accessory power pin supplies voltages, for example, 3.0 V to 3.3V+/−5% (2.85 V to 3.465 V) over the docking connector and remote connector (if present). A maximum current is shared between the docking connector and the remote connector.

By default, the portable media player supplies a particular current such as 5 mA. An appropriate software accessory detection system can be employed to turn on high power (for example, up to 100 mA) during active device usage. When devices are inactive, they typically consume less than a predetermined amount of power such as 5 mA current.

Accessory power is switched off for a period of, for example, approximately 2 seconds during the powering up of the portable media player. This is done to ensure that accessories are in a known state and can be properly detected. In one embodiment, accessories are responsible for re-identifying themselves after the portable media player transitions accessory power from the off to the on state.

Accessory power is grounded through the Digital Ground (DGND) pins.

FIG. 5C illustrates a reference schematic diagram for a system for detecting and identifying accessories for the docking connector. The system comprises:

a) A resistor (R) to ground allows the device to determine what type of accessory has been plugged into the docking connector.

b) Two identify and detect pins (Accessory Identify (pin 10, FIG. 4A) and Accessory Detect (pin 20, FIG. 4A)).

FIG. 5D is a reference schematic of an electret microphone that is within the remote connector.

Serial Protocol Communication:

a) Two pins used to communicate to and from device (Rx (pin 19, FIG. 4A) & Tx (pin 18, FIG. 4A)).

b) Input & Output (e.g., 0V=Low, 3.3V=High)

Figure 6:
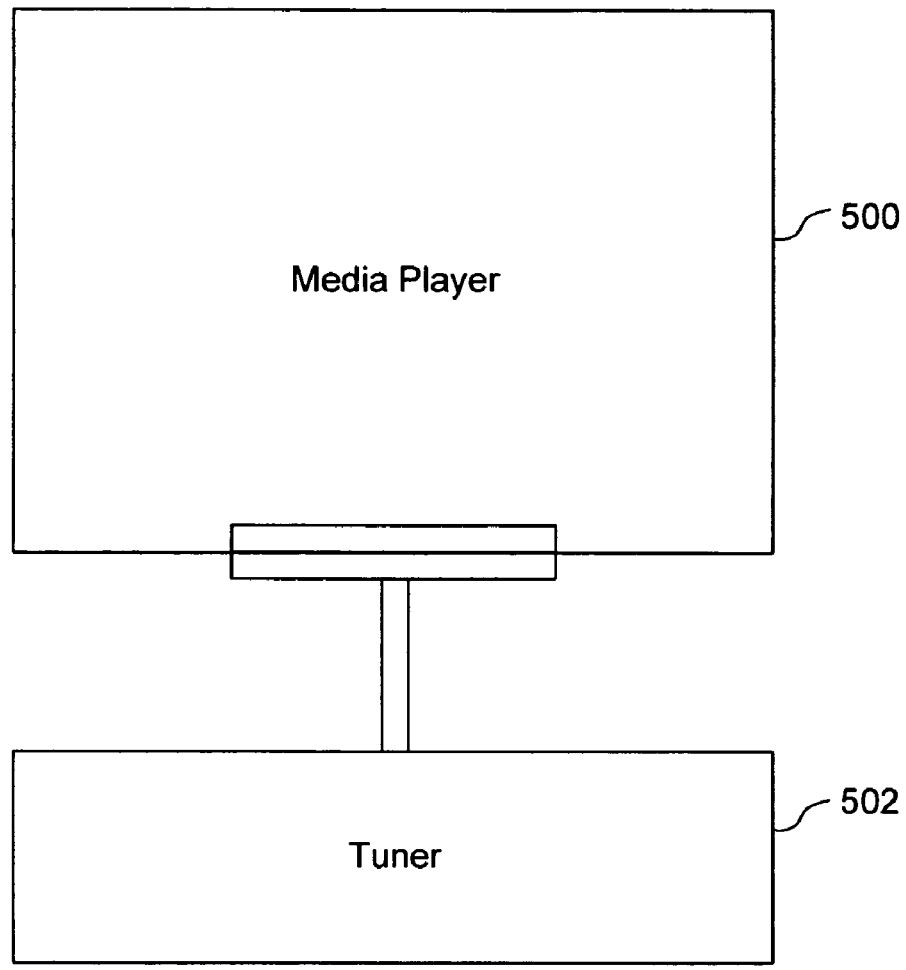
FIG. 6 illustrates a portable media player coupled to a tuner.

As mentioned previously, portable media players connect to a variety of accessories. FIG. 6 illustrate a portable media player 500 coupled to a tuner 502. Although FIG. 6 illustrates a portable media player 500 coupled directly to a tuner, the present invention may apply to any accessory that has a tuner, and still remain within the spirit and scope of the present invention.

As is seen, what is meant by accessories includes but is not limited to docking stations, chargers, car stereos, microphones, home stereos, computers, speakers, and accessories which communicate wirelessly with other accessories.

As mentioned previously, this connector interface system could be utilized with a command set for controlling an accessory having a tuner. In one embodiment, the accessory may be a host computer or any other electronic device or system that may communicate with the portable media player. It should be understood by one of ordinary skill in the art that although the above-identified connector interface system could be utilized with the command set, a variety of other connectors or systems could be utilized and they would be within the spirit and scope of the present invention.

Accessories with Tuners

For radio reception using a portable media player, accessories having a tuner may be attached to the portable media player. In one embodiment, when the portable media player detects an accessory, the portable media player may transition into a radio tuner mode where the portable media player can display, change, and/or control the settings, music source, RF band, tuner frequency, and Radio Data System/Radio Broadcast Data System (RDS/RBDS) data of the accessory. In one embodiment, RDS/RBDS data may include traffic information, song information (e.g., artist information, song name, radio station information, traffic alert information, etc.). The portable media player may display the RDS/RBDS data as well as other types of metadata on a screen. In one embodiment, an accessory may draw power from the portable media player or may supply power to the portable media player. In one embodiment, the portable media player may store stations and other state information. In one embodiment, the portable media player may notify the an accessory if a portable media player state changes such as transitioning to power on/light sleep/hibernate/deep sleep states.

Tuner Protocol

As described in more detail below, the portable media player and the accessory exchange commands. For example, utilizing the 30-pin connector in the interface between the portable media player and the accessory, the portable media player and the accessory would exchange commands over the serial protocol pins 18 and 19 (FIG. 4A). The portable media player and the accessory utilize the tuner protocol to exchange tuning information such as capability, state, and control information. In one embodiment, the tuner protocol enables the portable media player to function as a master device and enables the accessory to function as a slave device, responding to commands received from the portable media player. Accordingly, the portable media player may initiate actions such as controlling the power of the accessory, setting the tuner band/frequency, and initiating up/down frequency scans, etc.

When the portable media player sends a command to the accessory, the accessory responds with data when the command received from the portable media player requests data (e.g., capability or state information). In one embodiment, the accessory may respond with an acknowledgment command, which includes an acknowledgment and the requested data.

As described in more detail below, in one embodiment, the accessory transmits capability information to the portable media player. Based on the capability information received from the accessory, the tuner protocol may change the appearance of its display based on the presence/absence of certain tuner features. Generally, in one embodiment, if the portable media player sends a command to the accessory and the command involves a capability that the accessory does not support, the accessory may respond with an acknowledgement command indicating a failure (e.g., not supported).

In one embodiment, the tuner protocol may verify that the accessory has been instantiated, a tuner device associated with the accessory is actually present, and the tuner device has been authenticated successfully. In one embodiment, the tuner protocol parses the payload of commands, validates the received data, and sends a message to the appropriate application with the data received from the accessory. The tuner protocol applies appropriate time out operations as needed.

Although the present invention disclosed herein is described in the context of accessories having terrestrial tuners such as RF tuners, the present invention may apply to accessories having other types of tuners such as satellite tuners, and still remain within the spirit and scope of the present invention. Furthermore, in one embodiment, the tuner protocol may be used in conjunction with other protocols such as remote or display protocols. The following are example processes for controlling an accessory.

Figure 7:
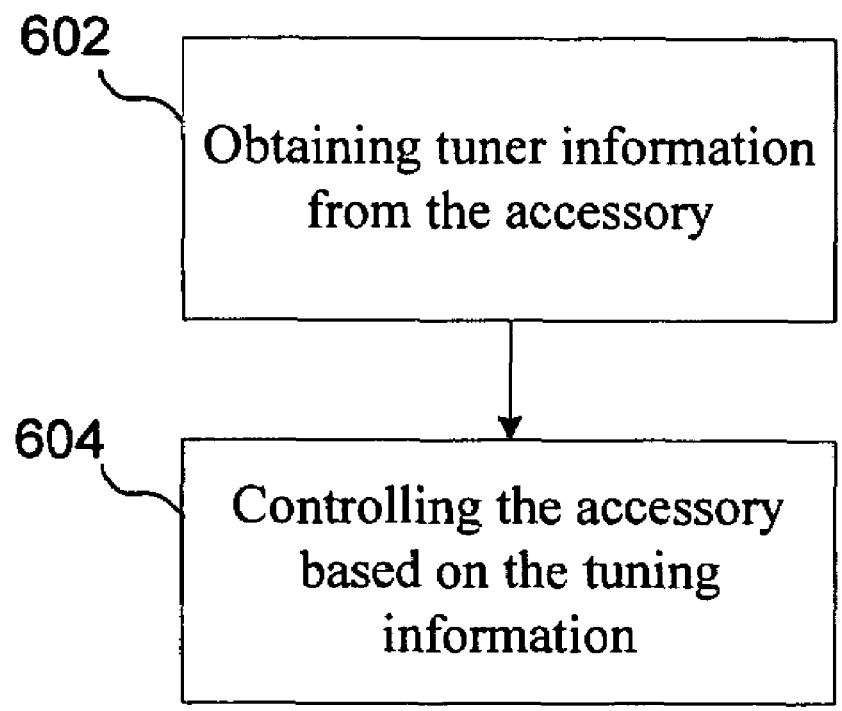
FIG. 7 is a flow chart, which illustrates a process for controlling an accessory.

FIG. 7 is a flow chart, which illustrates a process for controlling an accessory, in accordance with one embodiment of the present invention. As FIG. 7 illustrates, the process begins in step 602 where the portable media player obtains tuning information from the accessory, where the accessory includes a tuner for receiving signals such as radio signals. In one embodiment, the tuning information includes capability information and state information. As described in more detail below, the capability information may indicate what capabilities the accessory can perform. For example, the capability information may indicate that the accessory can perform radio frequency (RF) tuning functions, the tuner band or mode features of the accessory, etc. Also, the state information may indicate band information, frequency information, mode information, received signal strength indication (RSSI) information, etc. Next, in step 604, the portable media player controls the accessory based on the tuning information. More specifically, the portable media player transmits tuning information such as control information to the accessory to control the functionality of the accessory. More detailed embodiments of the capability, state, and control information, as well as their associated commands are described below in connection with FIG. 8.

Figure 8:
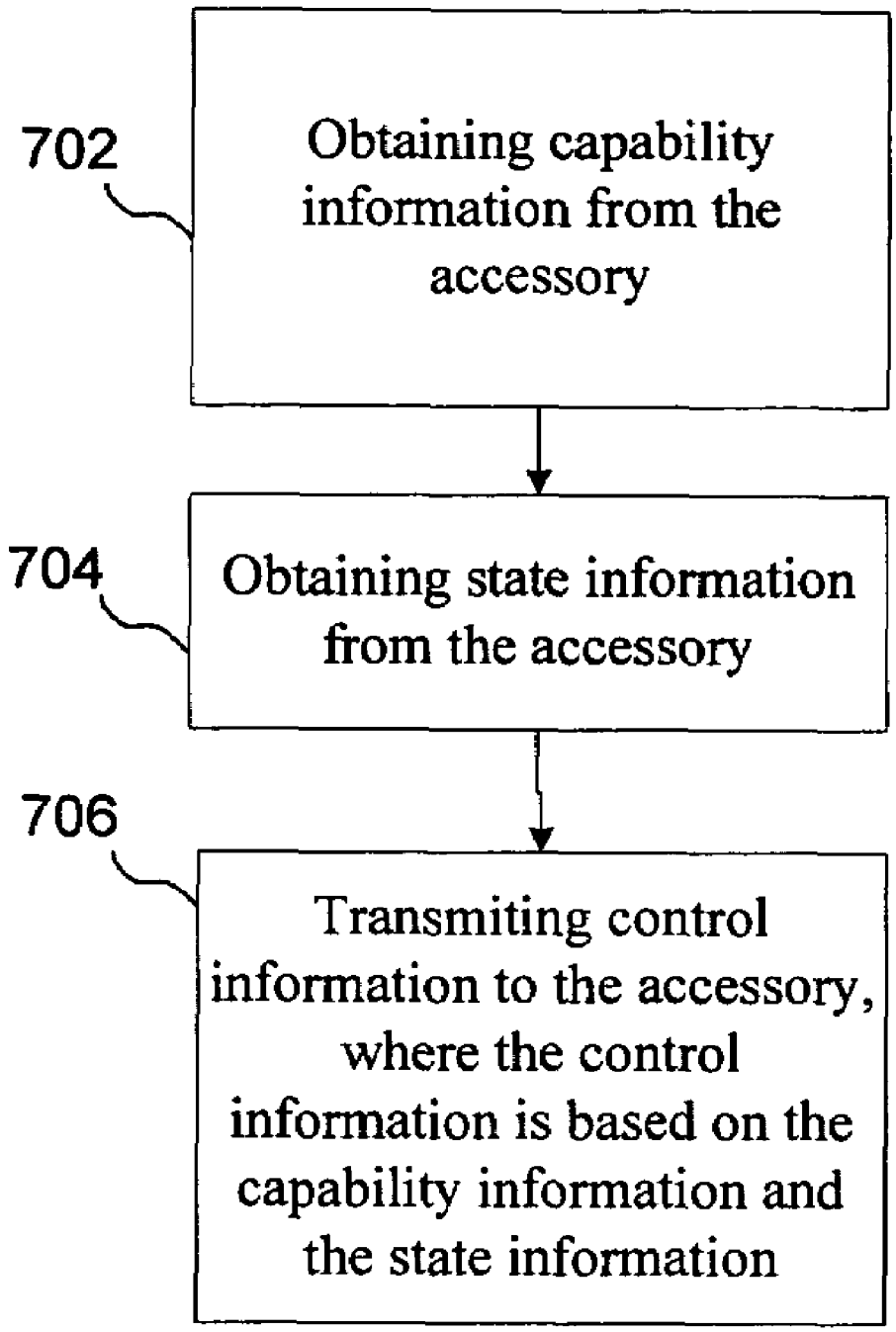
FIG. 8 is a flow chart, which illustrates another process for controlling an accessory.

FIG. 8 is a flow chart, which illustrates a process for controlling an accessory, in accordance with another embodiment of the present invention. As FIG. 8 illustrates, the process begins in step 702 where the portable media player obtains capability information from the accessory. More specifically, the portable media player transmits a command to the accessory requesting capability information. In response, the accessory transmits a command to the portable media player providing the capability information. As described in more detail below, the capability information may indicate, for example, band, resolution, mode, and control capabilities of the accessory.

Next, in step 704, the portable media player obtains state information from the accessory. More specifically, the portable media player transmits one or more commands to the accessory requesting the state information. In response, the accessory transmits one more commands to the portable media player providing the state information. As described in more detail below, the state information may include, for example, the current band, resolution, and mode of the accessory. In one embodiment, the portable media player may send commands to the accessory instructing the accessory to automatically send notifications to the portable media player indicating any state changes.

Next, in step 706, the portable media player transmits control information to the accessory, wherein the control information is based on the capability information and the state information. As described in more detail below, in one embodiment, the portable media player transmits one or more control commands to the accessory to set tuning functions and to control the accessory. In one embodiment, the control commands may be based at least in part on the capability information and the state information received from the accessory. Control commands may enable the portable media player to set band settings, set frequency settings, set mode settings, and/or control the operations of the accessory. As described in more detail below, the accessory may transmit an acknowledgment command including status information to the portable media player in response to commands received from the portable media player. For example, if the portable media player transmits a command to the accessory to set a frequency, the accessory may respond with an acknowledgement command including state information (e.g., the frequency to which the tuner of the accessory is tuned).

A method and system in accordance with the present invention for controlling an accessory has been disclosed. In one embodiment, the method includes obtaining tuning information from the accessory, where the tuning information may include capability information and state information. The method further includes controlling the accessory based on the tuning information by transmitting tuning information such as control information to the accessory to control the functionality of the accessory.

Although the present invention has been described in accordance with the embodiments shown, one of ordinary skill in the art will readily recognize that there could be variations to the embodiments and those variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-read-

What is claimed is:

1. A method for an accessory communicatively coupled with a portable media player, the accessory having a tuner for receiving radio signals, the method comprising:
    receiving a first command from the portable media player, the first command requesting tuner capability information indicating one or more capabilities of the tuner;
    sending a second command to the portable media player, the second command including the tuner capability information;
    receiving a third command from the portable media player, the third command requesting tuner state information indicating a current state of the tuner;
    sending a fourth command to the portable media player, the fourth command including the tuner state information; and
    subsequently to sending the second and fourth commands, receiving one or more fifth commands from the portable media player, wherein the one or more fifth commands include tuner control information for controlling the tuner, and wherein the tuner control information is based, at least in part, on the tuner capability information and the tuner state information.

2. The method of claim 1 further comprising:
    subsequently to receiving the one or more fifth commands, sending a sixth command to the portable media player, the sixth command acknowledging the one or more fifth commands.

3. The method of claim 1, wherein the tuner capability information includes one or more of: band capability information, mode capability information, resolution capability information, or control capability information.

4. The method of claim 1, wherein the tuner state information includes one or more of: current band information, current frequency information, current mode information, or current received signal strength (RSSI) information.

5. The method of claim 1, wherein the one or more fifth commands include one or more of: a command for modifying band settings, a command for modifying frequency settings, a command for modifying mode settings, a command for modifying power settings, or a command for controlling operation of the tuner.

6. The method of claim 1, wherein the one or more fifth commands include a command for instructing the accessory to automatically send notifications to the portable media player indicating state changes to the accessory.

7. The method of claim 1, wherein prior to sending the first command, the third command, or the one or more fifth commands, the portable media player is configured to verify that the accessory has been instantiated, verify that the tuner is physically present in the accessory, and verify that the tuner has been authenticated to interoperate with the portable media player.

8. The method of claim 1, wherein prior to sending the first command, the third command, or the one or more fifth commands, the portable media player is configured to detect the accessory and, upon detecting the accessory, present information pertaining to the tuner on a display of the portable media player.

9. The method of claim 1 further comprising receiving a sixth command from the portable media player, the sixth command indicating that the portable media player has changed state.

10. The method of claim 1, wherein the tuner is a terrestrial tuner or a satellite tuner.

11. The method of claim 2, wherein the sixth command includes tuner status information, the tuner status information indicating a status of the tuner after the one or more fifth commands are received by the accessory.

12. The method of claim 8, wherein the information pertaining to the tuner includes one or more of: tuner band, tuner frequency, music source, or Radio Data System/Radio Broadcast Data System (RDS/RBDS) data.

13. The method of claim 8, wherein the portable media player is configured to change the information presented on the display based on the tuner capability information.

14. A method for an accessory communicatively coupled with a portable media player, the accessory having a tuner for receiving radio signals, the method comprising:
    receiving a first command from the portable media player, the first command requesting tuner capability information indicating one or more capabilities of the tuner and tuner state information indicating a current state of the tuner;
    sending a second command to the portable media player, the second command including the tuner capability information and tuner state information; and
    subsequently to sending the second command, receiving one or more third commands from the portable media player, wherein the one or more third commands include tuner control information for controlling the tuner, and wherein the tuner control information is based, at least in part, on the tuner capability information and the tuner state information.

15. An accessory for use with a portable media player, the accessory comprising:
    a tuner for receiving radio signals;
    an interface adapted to be coupled with a portable media player and configured to support a tuner protocol for exchanging with the portable media player commands and information related to operation of the tuner; and
    a control module coupled to the interface, the control module being configured to:
        receive a first command from the portable media player, the first command requesting tuner capability information indicating one or more capabilities of the tuner;
        send a second command to the portable media player, the second command including the tuner capability information;
        receive a third command from the portable media player, the third command requesting tuner state information indicating a current state of the tuner;
        send a fourth command to the portable media player, the fourth command including the tuner state information; and
        subsequently to sending the second and fourth commands, receive one or more fifth commands from the portable media player, wherein the one or more fifth commands include tuner control information for controlling the tuner, and wherein the tuner control information is based, at least in part, on the tuner capability information and the tuner state information.

16. The accessory of claim 15, wherein the control module is further configured to:

subsequently to receiving the one or more fifth commands, send a sixth command to the portable media player, the sixth command acknowledging the one or more fifth commands.

17. The accessory of claim 15, wherein the tuner capability information includes one or more of: band capability information, mode capability information, resolution capability information, or control capability information.

18. The accessory of claim 15, wherein the tuner state information includes one or more of: current band information, current frequency information, current mode information, or current received signal strength (RSSI) information.

19. The accessory of claim 15, wherein the one or more fifth commands include one or more of: a command for modifying band settings, a command for modifying frequency settings, a command for modifying mode settings, a command for modifying power settings, or a command for controlling operation of the tuner.

20. The accessory of claim 15, wherein the one or more fifth commands include a command for instructing the accessory to automatically send notifications to the portable media player indicating state changes to the accessory.

21. The accessory of claim 15, wherein prior to sending the first command, the third command, or the one or more fifth commands, the portable media player is configured to verify that the accessory has been instantiated, verify that the tuner is physically present in the accessory, and verify that the tuner has been authenticated to interoperate with the portable media player.

22. The accessory of claim 15, wherein prior to sending the first command, the third command, or the one or more fifth commands, the portable media player is configured to detect the accessory and, upon detecting the accessory, present information pertaining to the tuner on a display of the portable media player.

23. The accessory of claim 15, wherein the control module is further configured to receive a sixth command from the portable media player, the sixth command indicating that the portable media player has changed state.

24. The accessory of claim 15, wherein the tuner is a terrestrial tuner or a satellite tuner.

25. The accessory of claim 15, wherein the interface comprises a connector having a plurality of signal pins, the signal pins being arranged to mate with corresponding signal pins on a mating connector of the portable media player.

26. The accessory of claim 15, wherein the connector comprises a keying arrangement, and wherein one set of keys are separated by one length and another set of keys are separated by another length.

27. The accessory of claim 16, wherein the sixth command includes tuner status information, the tuner status information indicating a status of the tuner after receiving the one or more fifth commands.

28. The accessory of claim 22, wherein the information pertaining to the tuner includes one or more of: tuner band, tuner frequency, music source, or Radio Data System/Radio Broadcast Data System (RDS/RBDS) data.

29. The accessory of claim 22, wherein the portable media player is configured to change the information presented on the display based on the tuner capability information.

30. The accessory of claim 25, wherein the plurality of signal pins includes a pair of serial pins and wherein the second and fourth commands are sent via a transmit pin of the pair of serial pins.

31. The accessory of claim 30, wherein the plurality of signal pins further includes:

a ground pin and a power pin adapted such that the ground pin makes contact with a corresponding ground pin in the mating connector of the portable media player before the power pin makes contact with a corresponding power pin in the mating connector of the portable media player;
a Firewire signal pin,
a USB signal pin;
a USB power pin;
an accessory identify signal pin;
an accessory detect signal pin;
a video output pin;
an accessory power pin;
a remote sense signal pin; and
a line signal pin.

32. An accessory for use with a portable media player, the accessory comprising:
a tuner for receiving radio signals;
an interface adapted to be coupled with a portable media player and configured to support a tuner protocol for exchanging with the portable media player commands and information related to operation of the tuner; and
a control module coupled to the interface, the control module being configured to:
receive a first command from the portable media player, the first command requesting tuner capability information indicating one or more capabilities of the tuner and tuner state information indicating a current state of the tuner;
send a second command to the portable media player, the second command including the tuner capability information and the tuner state information; and
subsequently to sending the second command, receive one or more third commands from the portable media player, wherein the one or more third commands include tuner control information for controlling the tuner, and wherein the tuner control information is based, at least in part, on the tuner capability information and the tuner state information.

33. A method for a portable media player communicatively coupled with an accessory having a tuner for receiving radio signals, the method comprising:
sending a first command to the accessory, the first command requesting tuner capability information indicating one or more capabilities of the tuner;
receiving a second command from the accessory, the second command including the tuner capability information;
sending a third command to the accessory, the third command requesting tuner state information indicating a current state of the tuner;
receiving a fourth command from the accessory, the fourth command including the tuner state information; and
subsequently to receiving the second and fourth commands, sending one or more fifth commands to the accessory, wherein the one or more fifth commands include tuner control information for controlling the tuner, and wherein the tuner control information is based, at least in part, on the tuner capability information and the tuner state information.

34. The method of claim 33 further comprising:
subsequently to sending the one or more fifth commands, receiving a sixth command from the accessory, the sixth command acknowledging the one or more fifth commands.

35. The method of claim 33, wherein the tuner capability information includes one or more of: band capability information, mode capability information, resolution capability information, or control capability information.

36. The method of claim 33, wherein the tuner state information includes one or more of: current band information, current frequency information, current mode information, or current received signal strength (RSSI) information.

37. The method of claim 33, wherein the one or more fifth commands include one or more of: a command for modifying band settings, a command for modifying frequency settings, a command for modifying mode settings, a command for modifying power settings, or a command for controlling operation of the tuner.

38. The method of claim 33, wherein the one or more fifth commands include a command for instructing the accessory to automatically send notifications to the portable media player indicating state changes to the accessory.

39. The method of claim 33 further comprising:
prior to sending the first command, the third command, or the one or more fifth commands, verifying that the accessory has been instantiated, verifying that the tuner is physically present in the accessory, and verifying that the tuner has been authenticated to interoperate with the portable media player.

40. The method of claim 33 further comprising:
prior to sending the first command, the third command, or the one or more fifth commands, detecting the accessory and, upon detecting the accessory, presenting information pertaining to the tuner on a display of the portable media player.

41. The method of claim 33 further comprising sending a sixth command to the accessory, the sixth command indicating that the portable media player has changed state.

42. The method of claim 33, wherein the tuner is a terrestrial tuner or a satellite tuner.

43. The method of claim 34, wherein the sixth command includes tuner status information, the tuner status information indicating a status of the tuner after the one or more fifth commands are received by the accessory.

44. The method of claim 40, wherein the information pertaining to the tuner includes one or more of: tuner band, tuner frequency, music source, or Radio Data System/Radio Broadcast Data System (RDS/RBDS) data.

45. The method of claim 40 further comprising:
changing the information presented on the display based on the tuner capability information.

46. A method for a portable media player communicatively coupled with an accessory having a tuner for receiving radio signals, the method comprising:
sending a first command to the accessory, the first command requesting tuner capability information indicating one or more capabilities of the tuner and tuner state information indicating a current state of the tuner;
receiving a second command from the accessory, the second command including the tuner capability information and tuner state information; and
subsequently to receiving the second command, sending one or more third commands to the accessory, wherein the one or more third commands include tuner control information for controlling the tuner, and wherein the tuner control information is based, at least in part, on the tuner capability information and the tuner state information.

47. A portable media player comprising:
a storage device configured to store a plurality of media assets;
an interface adapted to be coupled with an accessory having a tuner to receive radio signals, the interface being configured to support a tuner protocol for exchanging with the accessory commands and information related to operation of the tuner; and
a control module coupled to the storage device and the interface, the control module being configured to:
send a first command to the accessory, the first command requesting tuner capability information indicating one or more capabilities of the tuner;
receive a second command from the accessory, the second command including the tuner capability information;
send a third command to the accessory, the third command requesting tuner state information indicating a current state of the tuner;
receive a fourth command from the accessory, the fourth command including the tuner state information; and
subsequently to receiving the second and fourth commands, send one or more fifth commands to the accessory, wherein the one or more fifth commands include tuner control information for controlling the tuner, and wherein the tuner control information is based, at least in part, on the tuner capability information and the tuner state information.

48. The portable media player of claim 47, wherein the control module is further configured to:
subsequently to sending the one or more fifth commands, receiving a sixth command from the accessory, the sixth command acknowledging the one or more fifth commands.

49. The portable media player of claim 47, wherein the tuner capability information includes one or more of: band capability information, mode capability information, resolution capability information, or control capability information.

50. The portable media player of claim 47, wherein the tuner state information includes one or more of: current band information, current frequency information, current mode information, or current received signal strength (RSSI) information.

51. The portable media player of claim 47, wherein the one or more fifth commands include one or more of: a command for modifying band settings, a command for modifying frequency settings, a command for modifying mode settings, a command for modifying power settings, or a command for controlling operation of the tuner.

52. The portable media player of claim 47, wherein the one or more fifth commands include a command for instructing the accessory to automatically send notifications to the portable media player indicating state changes to the accessory.

53. The portable media player of claim 47, wherein the control module is further configured to:
prior to sending the first command, the third command, or the one or more fifth commands, verify that the accessory has been instantiated, verify that the tuner is physically present in the accessory, and verify that the tuner has been authenticated to interoperate with the portable media player.

54. The portable media player of claim 47, wherein the control module is further configured to:
prior to sending the first command, the third command, or the one or more fifth commands, detect the accessory and, upon detecting the accessory, present information pertaining to the tuner on a display of the portable media player.

55. The portable media player of claim 47, wherein the control module is further configured to send a sixth command to the accessory, the sixth command indicating that the portable media player has changed state.

56. The portable media player of claim 47, wherein the tuner is a terrestrial tuner or a satellite tuner.

57. The portable media player of claim 47, wherein the interface comprises a connector having a plurality of signal pins, the signal pins being arranged to mate with corresponding signal pins on a mating connector of the accessory.

58. The portable media player of claim 47, wherein the connector comprises a keying arrangement, and wherein one set of keys are separated by one length and another set of keys are separated by another length.

59. The portable media player of claim 48, wherein the sixth command includes tuner status information, the tuner status information indicating a status of the tuner after the one or more fifth commands are received by the accessory.

60. The portable media player of claim 54, wherein the information pertaining to the tuner includes one or more of: tuner band, tuner frequency, music source, or Radio Data System/Radio Broadcast Data System (RDS/RBDS) data.

61. The portable media player of claim 54, wherein the control module is further configured to change the information presented on the display based on the tuner capability information.

62. The portable media player of claim 57, wherein the plurality of signal pins includes a pair of serial pins and wherein the first command, third command, and one or more fifth commands are sent via a transmit pin of the pair of serial pins.

63. The portable media player of claim 62, wherein the plurality of signal pins further includes:
- a ground pin and a power pin adapted such that the ground pin makes contact with a corresponding ground pin in the mating connector of the accessory before the power pin makes contact with a corresponding power pin in the mating connector of the accessory;
- a Firewire signal pin,
- a USB signal pin;
- a USB power pin;
- an accessory identify signal pin;
- an accessory detect signal pin;
- a video output pin;
- an accessory power pin;
- a remote sense signal pin; and
- a line signal pin.

64. A portable media player comprising:
- a storage device configured to store a plurality of media assets;
- an interface adapted to be coupled with an accessory having a tuner to receive radio signals, the interface being configured to support a tuner protocol for exchanging with the accessory commands and information related to operation of the tuner; and
- a control module coupled to the storage device and the interface, the control module being configured to:
    - send a first command to the accessory, the first command requesting tuner capability information indicating one or more capabilities of the tuner and tuner state information indicating a current state of the tuner;
    - receive a second command from the accessory, the second command including the tuner capability information and the tuner state information; and
    - subsequently to receiving the second command, send one or more third commands to the accessory, wherein the one or more third commands include tuner control information for controlling the tuner, and wherein the tuner control information is based, at least in part, on the tuner capability information and the tuner state information.

* * * * *